Patented Feb. 22, 1938

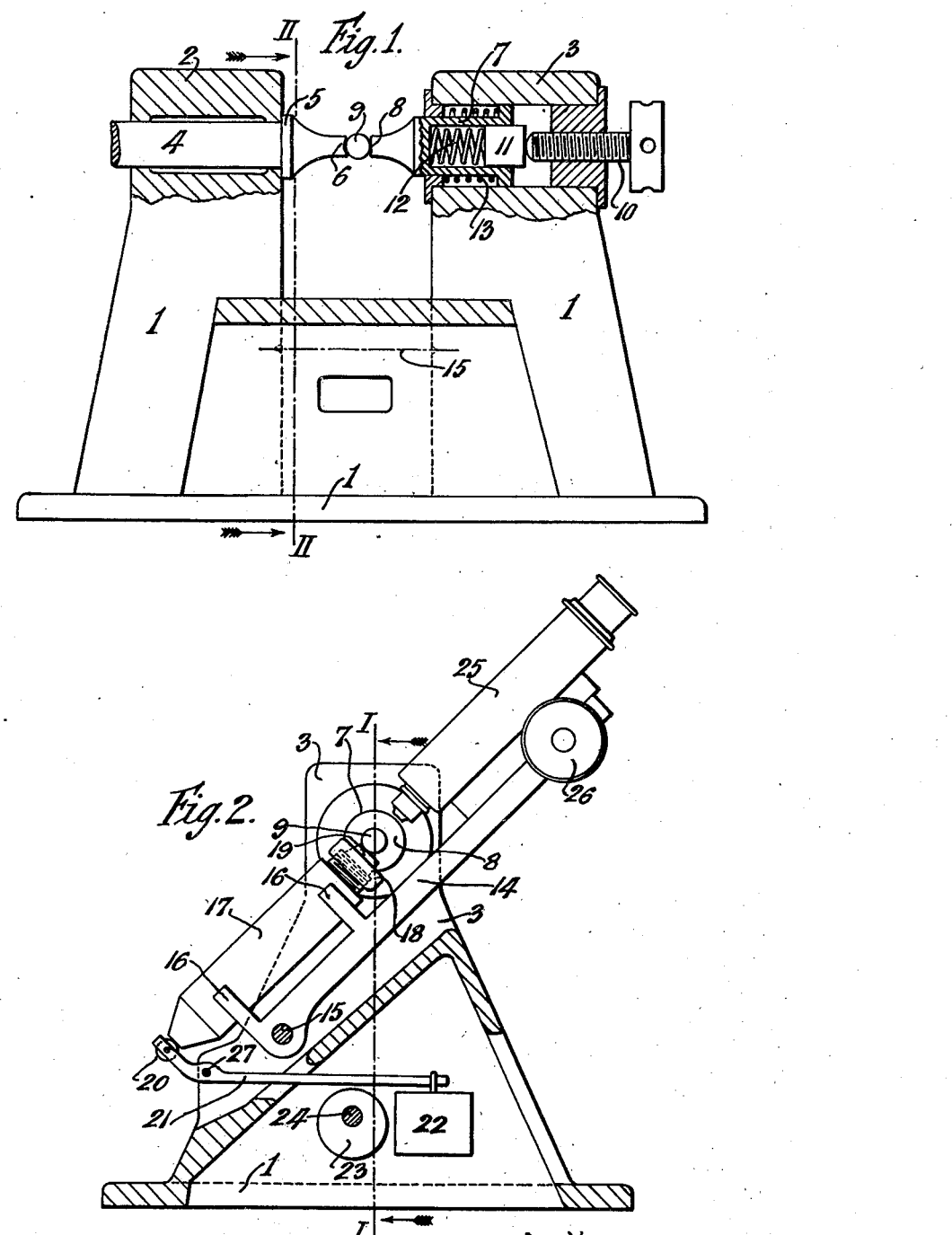

2,108,948

UNITED STATES PATENT OFFICE

2,108,948

TESTING OF LUBRICATION AND WEAR

Robert Low Heron Smith, Mottingham, London, England

Application January 4, 1937, Serial No. 119,028
In Great Britain January 20, 1936

7 Claims. (Cl. 73—51)

The invention relates to arrangements and methods for testing lubrication, bearing wear and the like. One of the methods already adopted for this purpose is to suspend a weighted pendulum on a horizontal rotating shaft by means of the bearing to be tested. The loading is effected by spring pressure, and the deflection of the pendulum from the vertical constitutes a measure of the friction. With an arrangement of this kind an actual bearing can be tested, but to arrive at the amount of wear involves a very long time of running to make the wear measurable by gauging or by weighing.

In another arrangement for testing lubricants or bearing materials and the like a flat surface of bearing metal is prepared and the cylindrical periphery of a hard steel or hard alloy wheel rotating at a known speed or for a known traverse is brought into contact with this surface under a known load. The pressure used is such that appreciable wear is produced in a short time, even very small wear being capable of measurement by means of the length of contact chord exhibited by the mark on the bearing metal surface. The results of such a test can be related empirically to the technical particulars of an ordinary bearing or the like and while it affords a considerable saving in time for any one test it necessitates very exact alignment between the cylindrical periphery of the wheel and the surface of the bearing metal, since any lack of parallelism would produce a considerable difference in contact chord as between one side and the other of the impression.

To overcome this disadvantage a further proposal has been made to modify the radial section of the periphery so that it is no longer a straight line parallel to the axis of rotation but is rounded or shaped to an angle, so that the depression made in the material is of oval or elongated, diamond shape, being longer in the direction in which the wheel is rotating than in the direction at right angles thereto.

With all of these forms a certain amount of wear and seizure takes place on the edge of the wheel during the test, and while this is usually small in relation to the wear of the bearing metal, yet it necessitates a further preparation of the surface, or even a new wheel, when a fresh test is to be taken. For instance, if the surface is dressed with fine emery, there is no certainty that the shape of the periphery will be maintained, that is the radius of curvature of the generating curve may not only be different from its original value but may be different in different parts of the same wheel.

According to the present invention the hard rotating member used in tests of the kind referred to for impressing the bearing metal surface is spherical. Preferably it takes the form of a steel ball as manufactured for ball bearings; it may then be conveniently clamped between rotating horizontal supporting members one or both of which have cupped ends, though other orientations of the supporting members are possible. The impression produced on the bearing metal by a spherical member is always circular in outline and is in fact a segment of a sphere.

After the carrying out of a test a ball of this kind may not be suitable for a further test without touching up, just as in the case of the wheel. On the other hand, steel balls are so cheap and are produced with such high accuracy as to dimensions and with such high polish that it would not be worth while touching up the ball; one simply throws away the ball which has been used and takes a new one for the fresh test.

It is particularly convenient to use for the purpose of the invention the same size of ball as is used as standard in the Brinell hardness testing machine, namely 1 cm. diameter. A suitable machine is illustrated in the accompanying drawing, and though intended primarily for a 1 cm. ball could obviously be used for any other size of ball.

In the drawing

Figure 1 is an elevation of the machine partly in section on the line I—I of Figure 2 viewed in the direction of the arrows and with the parts for supporting, loading and examining the specimen omitted for the sake of clarity, and Figure 2 is a sectional end elevation taken on the line II—II of Figure 1 and viewed in the direction of the arrows to show the parts omitted from Figure 1.

Referring to the drawing, a main housing or main casting 1 is integral with two trunnions 2 and 3. The trunnion 2 serves to support a rotatable shaft 4 having a locating flange 5 and a cupped end 6.

The conventional showing will usually be replaced in practice by ball journal and thrust bearings. A coupling, preferably flexible, is mounted on the outer end of the shaft 4 to connect the latter to suitable driving means. The coupling and driving means, being of any suitable form, are not shown in the drawing. The necessary speed variation gear, techometer and revolution counter are likewise omitted from the drawing.

The trunnion 3 has a sliding horizontal shaft 7 with tapered end terminating in a smooth flat face 8, and the shaft 7 is in line with the shaft 4 so that longitudinal pressure on the shaft 7 causes a 1 cm. steel ball 9 to be gripped between the cupped face 6 and the flat face 8. On account of the higher friction between the ball 9 and the cupped end 6 the ball will be driven at the same speed as the shaft 4, while the lubricant used in the test, or supplied separately if required, lubricates the contact surface between the ball 9 and the flat face 8.

The pressure for gripping the ball is produced by a screw 10 in a tapped hole in the trunnion 3. The point of the screw 10 bears on a block 11 and a stiff spring 12 enclosed in a hollow of the shaft 7 is interposed between the block 11 and the end of the hollow in the shaft 7 to maintain the pressure gripping the ball 9. A light spring 13 ensures the return movement of the shaft 7 when the screw 10 is unscrewed and the spring 12 is relieved of pressure.

An inclined bracket 14 is pivoted to the main housing 1 at 15 and can be fixed by means not shown at approximately the slope shown in Figure 2. The lower part of the bracket 14 has two V-shaped guides 16 which support a shaft 17 so that the latter is free to slide longitudinally of the bracket 14.

The upper end of the shaft 17 is provided with a screw cap 18, by means of which the test specimen 19 is held firmly on the shaft. The lower end of the shaft 17 rests on a roller 20 at the outer end of a lever 21. The lever has a horizontal arm on which a weight 22 may be placed for loading the specimen. Preferably the arrangement is made that the unbalanced weight of the lever 21 just counterbalances the weight of the shaft 17 and specimen 19. The value of a weight 22 placed on the lever at the predetermined position multiplied by a constant factor then gives the load applied between the rotating ball and the specimen.

Below the lever 21 a cam 23 is eccentrically mounted on a shaft 24. The shaft can be rotated into either of two positions by means of a handle not shown. In the position of Figure 2 the weight 22 is pressing the specimen 19 against the ball 9. When the cam is turned to the opposite position the lever is supported thereon and the shaft 17 moves down a little bringing the specimen 19 away from the ball 9. By turning the shaft 24 back to the position of Figure 2 the load can be applied gradually so as not to make any false impression on the specimen.

The upper part of the bracket 14 carries a microscope 25 by which the impression on the specimen 19 can be examined and measured. The focusing adjustment is shown at 26. When it is desired to view an impression through the microscope the bracket 14 is swung a little upwards on the pivot 15, till the line of vision is clear of the ball 9. Alternatively the ball 9 can be simply removed. Usually the function of the microscope is to measure the diameter of the impression, which forms an index of the wear.

The pivot 15 for the bracket 14 will in practical construction be in line with the point of contact of the roller 20 with the lower end of the shaft 17, although for the sake of clarity in the drawing this pivot has been shown in a different position.

It will be noted that the shaft 17 is so mounted that the ball 9 does not make contact with the centre of the test specimen 19. The point of contact is preferably about half way between the centre and the periphery. A whole series of impressions can thus be made on one specimen by slightly rotating the shaft 17 after each test.

One useful type of test is to conduct a series of tests in this manner with gradually increasing periods until consecutive test impressions are of practically identical size. The load is then calculated from the size of the impression in terms of pounds per square inch or kilos per square millimetre and this figure represents the maximum load which should be employed for the bearing material under test when running under ordinary practical conditions with the lubricant employed in the test. Numerous different types of tests can be employed with bearing metals and also with lubricants since the ball can be run continuously or intermittently, with load on continuously or intermittently.

The method according to the present invention has the advantage in common with the wheel method of providing a result in a very much shorter space of time than the test mentioned at the commencement with the use of an actual bearing; on the other hand these other methods have all the disadvantage from the purely scientific point of view that an exact computation of the forces producing wear cannot be made. This arises from the fact that the initial contact is either a point or a line, and the pressure per unit area would be infinite if account were not taken of the elastic and plastic deformations of the two members concerned, which are, however, very difficult to arrive at.

For the purpose of carrying out a test under known and measurable conditions from the commencement the ball may be pressed by means of a Brinell machine into the bearing surface while stationary so that wear is commenced with a definite contact area already established. The impression could also be effected by means of a vise. In either case the operation can be repeated with gradually increasing pressure until the desired diameter of impression is produced. Alternatively a depression of a larger diameter may be produced and then reduced by grinding off the surface of the bearing metal to the required extent. The type of surface produced on the bearing metal by means of this pressure is ideal because it is produced by the pressure of a polished ball.

A preliminary run like a short test could follow to ensure the sphericity of the impression before starting the actual test run. The area of the depression can be obtained at any stage from its measured diameter, and the pressure per unit area at the commencement or any other point of the test can thus be calculated. The wear at any time can be computed from the diameter of the circle of the depression by taking into account also the diameter of the ball.

By means of the invention rapid tests can be made both of lubricants and of bearing metals under standardized conditions, which can readily be reproduced at will and of which the equivalents in ordinary bearing practice can be ascertained once and for all.

What I claim is:—

1. Apparatus for testing bearing metals or lubricants comprising in combination a support for a specimen of bearing metal, a steel bearing ball, a cupped member and a smooth flat member located to grip the ball between them, driving means for rotating the cupped member, spring pressure means behind the smooth member, and means for pressing the specimen support against the ball transversely to the axis of rotation of the cupped member.

2. Apparatus for testing bearing metals or lubricants comprising in combination a support, a bracket pivoted thereon, a shaft longitudinally slidable on the bracket, a support at one end of the shaft for a specimen of bearing metal, a steel bearing ball, means for rotating the ball on an axis transverse to the sliding direction of the shaft, means for pressing the shaft in its sliding direction against the ball, and a measuring microscope attached to the bracket approximately in line with the sliding shaft.

3. Apparatus for testing bearing metals or lubricants comprising in combination a sliding shaft, a support thereon for a specimen of bearing metal, a steel bearing ball, means for rotating the said ball on an axis transverse to the sliding direction of the shaft, a weighted lever bearing on the shaft in its direction of sliding to press the specimen of bearing metal against the ball, an excentric cam below one arm of the lever and means for rotating the cam to support or release the lever.

4. Apparatus for testing bearing metals or lubricants comprising in combination a support, a bracket pivoted thereon, a shaft longitudinally slidable on the bracket, a support at one end of the shaft for a specimen of bearing metal, a steel bearing ball, a cupped member journalled in the first-named support, driving means for rotating the cupped member, a smooth flat member slidable in the first-named support and located to grip the ball between it and the cupped member, spring pressure means behind the smooth member, a weighted lever bearing on the shaft in its direction of sliding to press the specimen of bearing metal against the ball, said lever being pivoted on the first-named support, an excentric cam below one arm of the lever and means for rotating the cam to support or release the lever.

5. Apparatus for testing bearing metals or lubricants comprising in combination a support for a specimen of bearing metal, a steel bearing ball, members disposed on opposite sides of the ball to grip the ball between them, driving means for rotating one of said members, and means for pressing the specimen support against the ball transversely to the axis of rotation of the driven member and ball.

6. Apparatus for testing bearing metals or lubricants comprising in combination a support for a specimen of bearing metal, a steel bearing ball, members disposed on opposite sides of the ball to grip the ball between them, driving means for rotating one of said members, means for moving said members toward each other to releasably grip said ball, and means for pressing the specimen support against the ball transversely to the axis of rotation of the driven member and ball.

7. Apparatus for testing bearing metals or lubricants comprising in combination a support for a specimen of bearing metal, a steel bearing ball, members disposed on opposite sides of the ball to grip the ball between them, driving means for rotating one of said members, resilient pressure means behind one of said members and means for pressing the specimen support against the ball transversely to the axis of rotation of the driven member and ball.

ROBERT LOW HERON SMITH.